(12) United States Patent
Inamori

(10) Patent No.: US 9,956,486 B2
(45) Date of Patent: May 1, 2018

(54) GAME PROCESSING SYSTEM, GAME PROCESSING PROGRAM, AND GAME PROCESSING METHOD

(71) Applicant: GREE, INC., Tokyo (JP)

(72) Inventor: Ryosuke Inamori, Tokyo (JP)

(73) Assignee: GREE, INC., Tokyo (JP)

( * ) Notice: Subject to any disclaimer, the term of this patent is extended or adjusted under 35 U.S.C. 154(b) by 514 days.

(21) Appl. No.: 14/627,157

(22) Filed: Feb. 20, 2015

(65) Prior Publication Data

US 2015/0238861 A1 Aug. 27, 2015

(30) Foreign Application Priority Data

Feb. 24, 2014 (JP) ................................ 2014-032662

(51) Int. Cl.
| | | |
|---|---|---|
| *A63F 13/537* | (2014.01) | |
| *A63F 13/426* | (2014.01) | |
| *A63F 13/2145* | (2014.01) | |
| *A63F 13/5375* | (2014.01) | |
| *A63F 13/69* | (2014.01) | |

(52) U.S. Cl.
CPC ........ *A63F 13/537* (2014.09); *A63F 13/2145* (2014.09); *A63F 13/426* (2014.09); *A63F 13/5375* (2014.09); *A63F 13/69* (2014.09)

(58) Field of Classification Search
USPC .......................................................... 463/31
See application file for complete search history.

(56) References Cited

U.S. PATENT DOCUMENTS

| 8,271,497 B2 * | 9/2012 | Ikenoue | ............ G06F 17/30241 |
| | | | 701/426 |
| 2004/0266528 A1 * | 12/2004 | Wang | ...................... A63F 13/04 |
| | | | 463/37 |
| 2015/0194023 A1 * | 7/2015 | Brackenridge | ........ G06Q 30/06 |
| | | | 235/380 |
| 2015/0238861 A1 * | 8/2015 | Inamori | ................ A63F 13/537 |
| | | | 463/31 |

FOREIGN PATENT DOCUMENTS

| JP | 2003-019350 | 1/2003 |
| JP | 2010-029636 | 2/2010 |
| JP | 2011-206446 | 10/2011 |
| JP | 2012-210477 | 11/2012 |

(Continued)

OTHER PUBLICATIONS

Office Action dated Mar. 1, 2017 in Japanese Patent Application No. 2016-122562 (with English translation).

(Continued)

*Primary Examiner* — Pierre E Elisca
(74) *Attorney, Agent, or Firm* — Oblon, McClelland, Maier & Neustadt, L.L.P.

(57) ABSTRACT

A game processing system that controls a display to display a plurality of graphic forms each indicating an identifier; identifies a trajectory of a continuously drawn input selecting a plurality of the graphic forms; identifies the identifiers of the graphic forms corresponding to the input trajectory; identifies at least a first command based on an arrangement of the identifiers when detecting an end of the input; and controls a game operation of attacking an opponent based on the command.

30 Claims, 9 Drawing Sheets

(56) References Cited

FOREIGN PATENT DOCUMENTS

| JP | 2014-004471 | 1/2014 |
| JP | 2014-027975 | 2/2014 |
| JP | 2015-156931 A | 9/2015 |

OTHER PUBLICATIONS

Game Cast, "Introduction to Dungeon Raid," Youtube, Published on Apr. 7, 2011, [online search] searched on Feb. 13, 2017, URL https://youtube.com/watch?v=ae9scDX- I iY 9 pages (with Partial English translation).

Dungeon Raid, GameCast iPhone, Feb. 2, 2011, http://www.gamecast-blog.com/archives/65492178.html.

Knight gundam puzzle heroes, TABRIOD, Jan. 26, 2014, http://www.tabroid.jp/app/games/2014/01/com.namcobandaigames.kgp.html.

Office Action issued Jun. 13, 2017 in Japanese Patent Application No. 2016-122562 (with unedited computer generated English translation).

\* cited by examiner

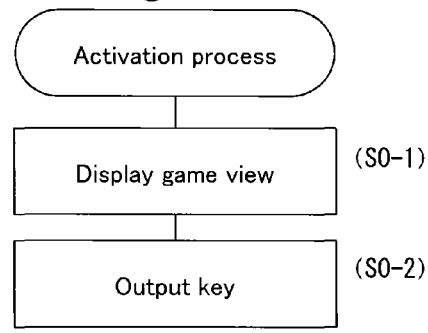
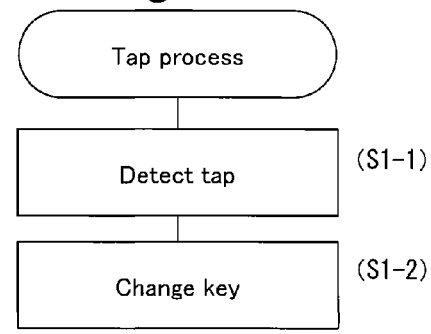
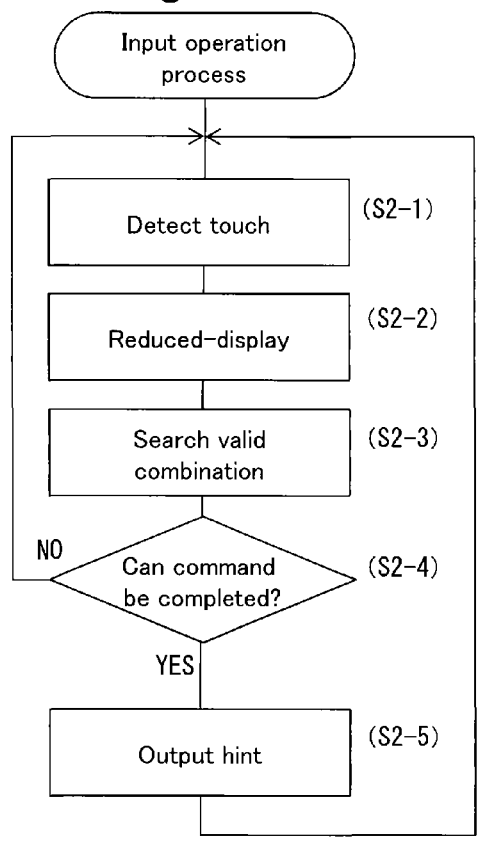
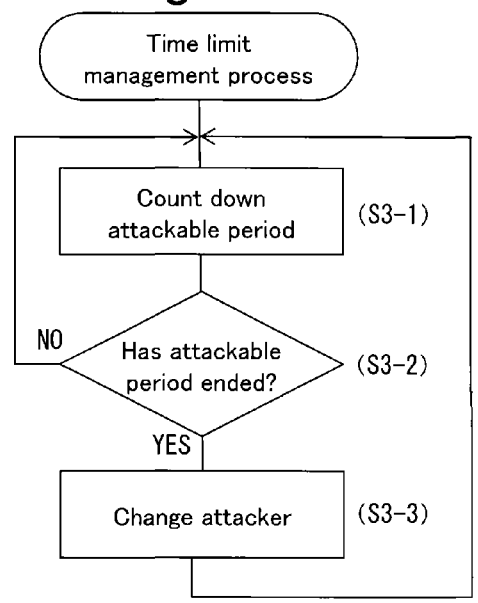

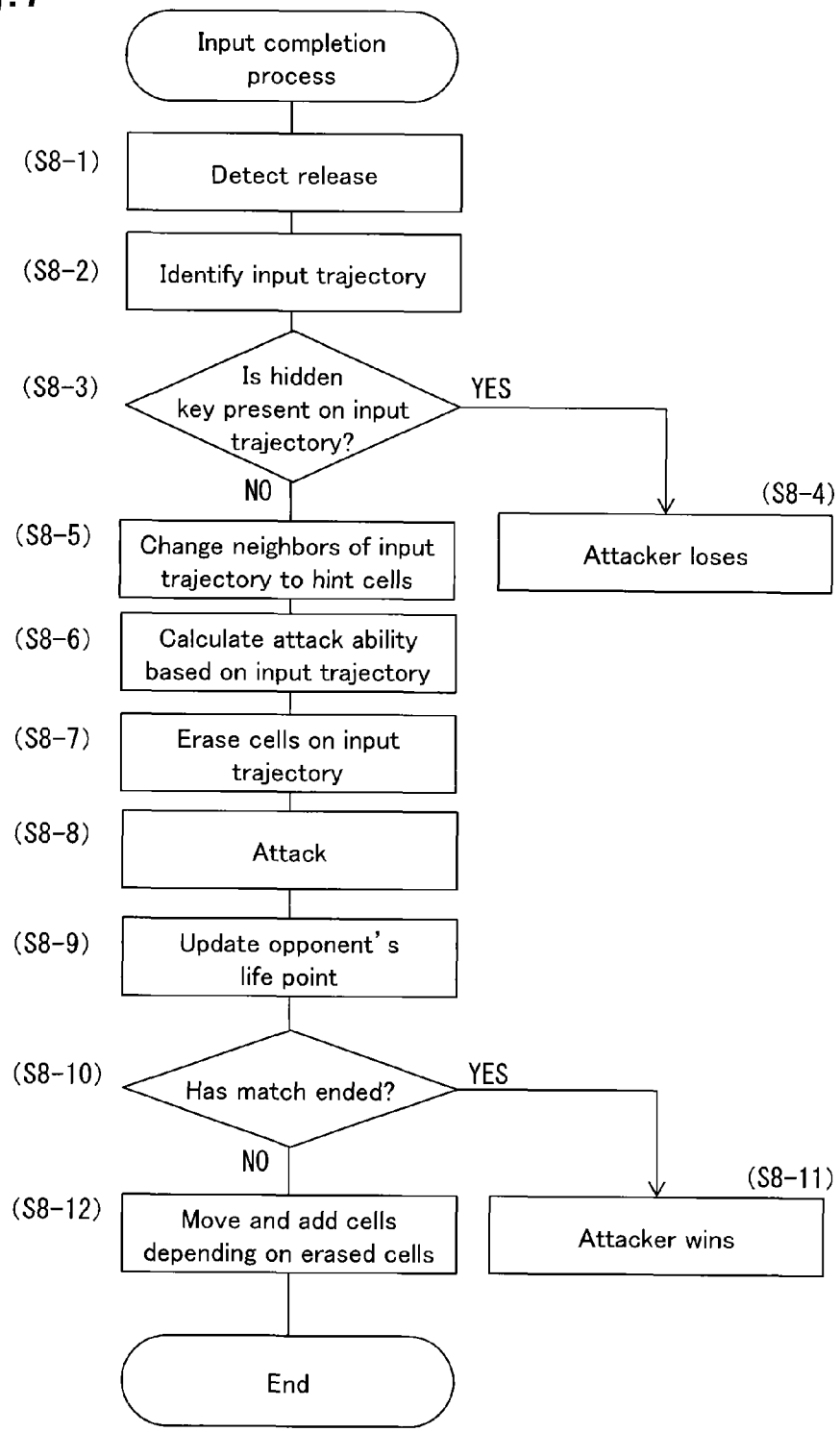

GAME PROCESSING SYSTEM, GAME PROCESSING PROGRAM, AND GAME PROCESSING METHOD

CROSS-REFERENCE TO RELATED APPLICATION

This application is based upon and claims the benefit of priority of the prior Japanese Patent Application No. 2014-032662, filed on Feb. 24, 2014, 2014, the entire contents of which are incorporated herein by reference.

BACKGROUND

The present disclosure relates to a game processing method for providing a one-on-one fighting game to computer devices, a game processing system therefor, and a game processing program therefor.

In recent years, application software such as various game applications is provided to computer devices such as smartphones. Users utilizing such computer devices play games provided by game applications. Japanese Laid-Open Patent Publication No. 2014-4471 discloses therein a technique for one-on-one games. In a one-on-one game, a user plays a game with another user. With the technique, in order to increase users' interests, a game server performs predetermined actions based on property data associated with the user and the other user. Thereby, the user and the other user can obtain more synergistic effects due to mutual cooperation of the users than expected.

When playing such a game, a user can use a touch panel display as an I/O means. Japanese Laid-Open Patent Publication No. 2012-210477 discloses a game device for facilitating operations and motions of a player object of a user to be easily input. In the game device, a user-input coordinate is detected in an operation area of the touch panel. The operation area is provided with an operation input area, and a direction input area surrounding the operation input area. The operations of the player object are controlled based on the detected coordinates in the operation input area, and the motions of the player object are controlled based on the detected coordinates in the direction input area.

Further, Japanese Laid-Open Patent Publication No. 2011-206446 discloses a technique for puzzle games in the motif of diagrams drawn with a single stroke. In the puzzle game, characters configuring a word or sentence are allocated to cells, and the cells are presented as questions to the user playing the game. The user answers correct arrangement of characters, that is, the original word or sentence.

As described in Japanese Laid-Open Patent Publication No. 2014-4471, a one-on-one game increases users' interests. Further, as described in Japanese Laid-Open Patent Publications No. 2012-210477 and No. 2011-206446, the operability of the touch panel display is important in terms of improvement in usability such as improvement in operability. However, the users' interests are difficult to be increased with just a one-on-one game or improvement in operability.

SUMMARY

It is an objective of the present disclosure to provide a game processing method for realizing a one-on-one fighting game using input trajectories drawn with a single stroke, a game processing system therefor, and a game processing program therefor. When a user plays a game with another user in the one-on-one fighting game, the contents of attacks on the other user are determined based on input trajectories by the user.

To achieve the foregoing objective and in accordance with a first aspect of the present disclosure, a game processing system is provided that includes an I/O unit configured by a touch panel display and a control unit for managing progress of the game. The control unit is configured to display in the I/O unit an operation view in which graphic forms each indicating an identifier are arranged, identify an input trajectory drawn with a single stroke made of continuously selected graphic forms on the operation view, identify the identifiers of the graphic forms configuring the input trajectory, identify a valid command based on an arrangement of the identifiers when detecting an end of the input trajectory drawn with the single stroke, and attack the opponent by use of the valid command.

In accordance with a second aspect of the present disclosure, a non-transitory computer-readable recording medium is provided that records therein a program for performing a game processing method by use of a computer. The computer includes an I/O unit configured by a touch panel display and a control unit for managing progress of the game. The control unit is configured to display in the I/O unit an operation view in which graphic forms each indicating an identifier are arranged, identify an input trajectory drawn with a single stroke made of continuously selected graphic forms on the operation view, identify identifiers of the graphic forms configuring the input trajectory, identify a valid command based on an arrangement of the identifiers when detecting an end of the input trajectory drawn with a single stroke, and attack an opponent by use of the valid command.

In accordance with a third aspect of the present disclosure, a method is provided for providing a game by use of a game processing computer including an I/O unit configured by a touch panel display and a control unit for managing progress of the game. The control unit displays in the I/O unit an operation view in which graphic forms each indicating an identifier are arranged, identifies an input trajectory drawn with a single stroke made of continuously selected graphic forms on the operation view, identifies the identifiers of the graphic forms configuring the input trajectory, identifies a valid command based on an arrangement of the identifiers when detecting an end of the input trajectory drawn with the single stroke, and attacks an opponent by use of the valid command.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 2A is an explanatory diagram of an activation process in the system of FIG. 1;

FIG. 2B is an explanatory diagram of a tap process in the system of FIG. 1;

FIG. 2C is an explanatory diagram of an input operation process in the system of FIG. 1;

FIG. 2D is an explanatory diagram of a time limit management process in the system of FIG. 1;

FIG. 7 is an explanatory diagram of processes in the system according to the second embodiment;

DETAILED DESCRIPTION OF THE PREFERRED EMBODIMENTS

<First Embodiment>

A game processing method according to one embodiment will be described below with reference to FIGS. 1 to 5D. In the present embodiment, it is assumed that a game application for one-on-one fighting game is provided to a user. In the one-on-one fighting game, a user as a player attacks another user, or another game player, via input commands.

Figure 1:
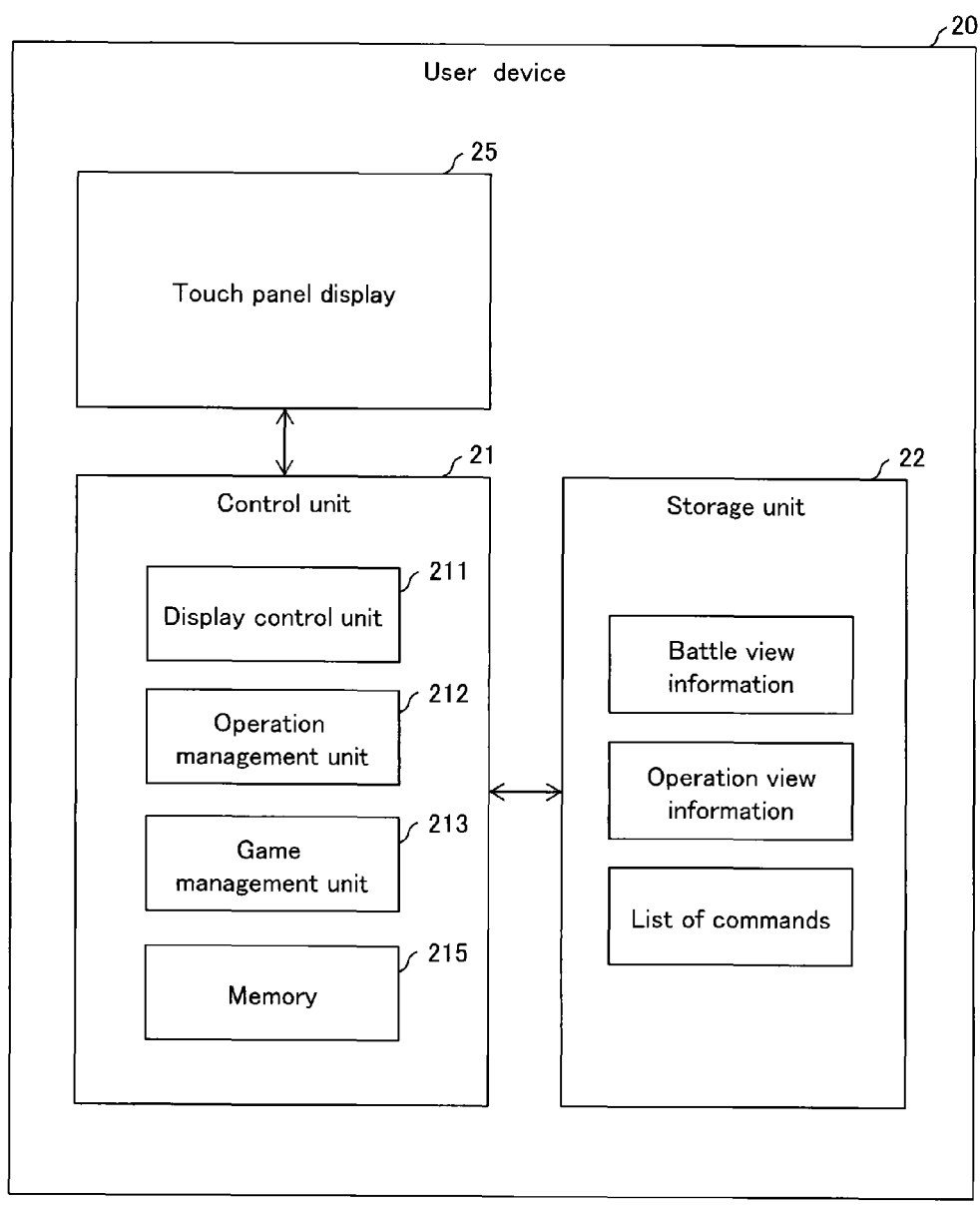
FIG. 1 is a schematic diagram of a system according to a first embodiment.

As illustrated in FIG. 1, a user device 20 stores a game application (that is, a program) therein.

The user device 20 is a game processing computer (information processing device such as a smartphone, for example) used by a user who plays games. The user device 20 includes a control unit 21, which has a CPU, a RAM and a ROM, a storage unit 22, and a touch panel display 25.

The touch panel display 25 as an I/O unit functions as an output means and an input means for the user. Specifically, the user device 20 outputs information on the touch panel display 25. The user can perform various icon operations depending on a touch state on the screen, such as an operation of touching the screen of the touch panel display 25 with a finger or another input tool (touch operation), an operation of releasing the finger from the screen (release operation), and an operation of sliding the finger on the screen while keeping touching the screen (swipe operation).

The control unit 21 executes the game application stored in the storage unit 22 thereby to function as a display control unit 211, an operation management unit 212, and a game management unit 213.

The display control unit 211 controls a view on the screen of the touch panel display 25.

The operation management unit 212 detects a touch state on the screen of the touch panel display 25, and identifies the user-input contents.

The game management unit 213 manages a game progress of a one-on-one game. For the game progress, attacks from the attacking player who has a right to attack in a match to the defending player, winning/losing judgment, and the like are managed. The game management unit 213 holds data on an attack time limit by which the attacking player is changed.

Figure 4A:
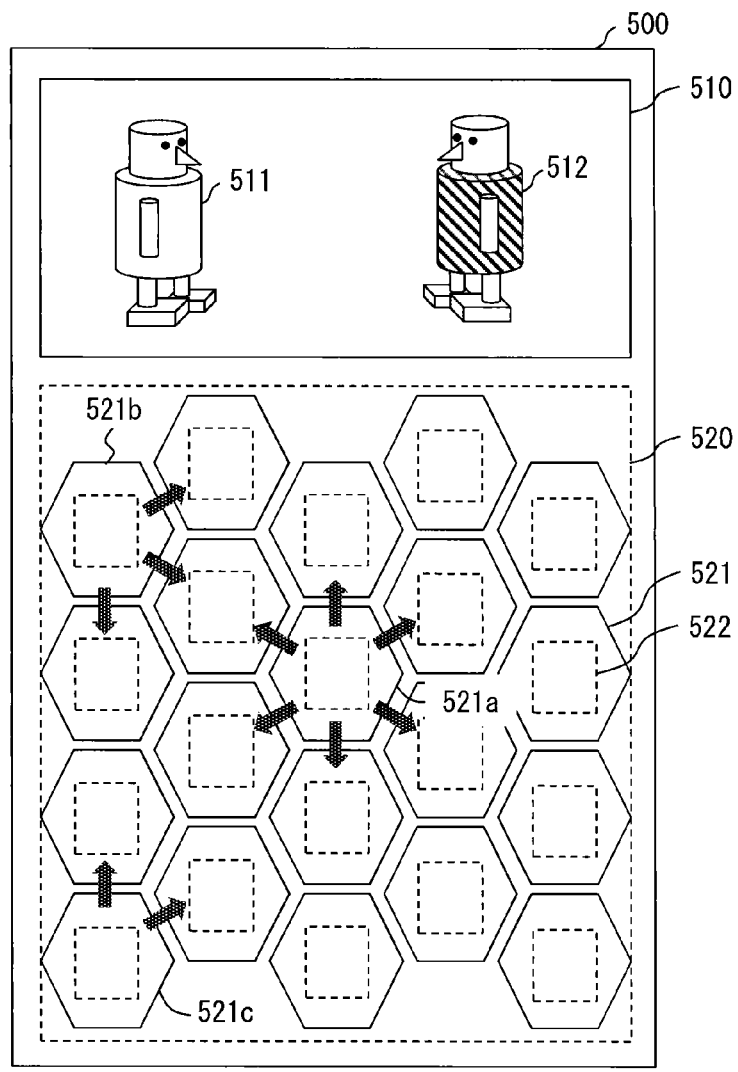
FIG. 4A is an explanatory diagram of a game view in the system of FIG. 1.

As illustrated in FIG. 4A, according to the present embodiment, a game view 500 includes a battle display area 510 and an operation area 520.

Player images 511 and 512 of the players who fight each other are displayed in the battle display area 510. In the present embodiment, the player image 511 of the user and the player image 512 of the opponent are displayed. Herein, the opponent is not another user but a computer.

A plurality of polygonal icons 521 as two-dimensionally arranged graphic forms is displayed in the operation area 520. In the present embodiment, the polygonal icons 521 are hexagons. Each polygonal icon 521 is arranged adjacent to other polygonal icons 521. More specifically, the sides of each polygonal icon 521 oppose the corresponding sides of other adjacent polygonal icons 521. For example, the polygonal icons 521a, 521b and 521c are adjacent to six, three and two polygonal icons 521, respectively. The user moves (swipes) with a single stroke a position touched by a finger or another input tool on the screen of the touch panel display 25, thereby selecting a plurality of adjacent polygonal icons 521 along the input trajectory drawn with a single stroke. That is, the user performs a swipe operation on the screen of the touch panel display 25 thereby to select polygonal icons 521 depending on an input trajectory in the swipe operation.

Further, as illustrated in FIG. 4A, each polygonal icon 521 is provided with an information display area 522, in which an identifier indicating an allocated key is displayed. When the user selects polygonal icons 521 via the swipe operation, a key sequence in which the keys (input keys) allocated to the selected polygonal icons 521 are linked is generated, and an attack command depending on the key sequence is selected.

Figure 4B:
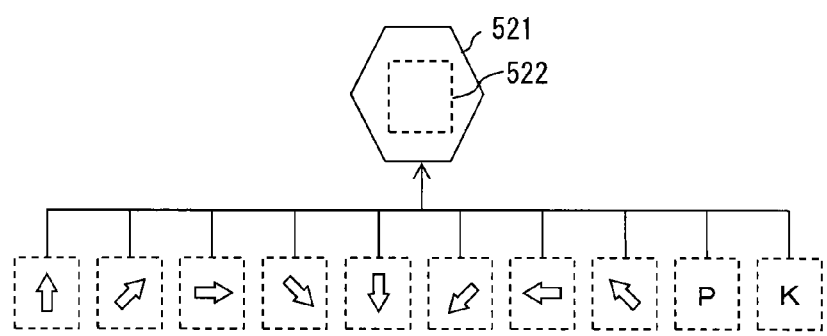
FIG. 4B is an explanatory diagram of keys displayed in a polygonal icon in the game view of FIG. 4A.

As illustrated in FIG. 4B, in the present embodiment, each information display area 522 displays therein any of the arrow symbols indicating "up", "down", "left", "right", "upper right", "upper left", "lower right" and "lower left", and the characters associated with attack types including "P (punch)" and "K (kick)." Any key identifiers capable of identifying each polygonal icon 521 may be employed, and colors may be employed in addition to symbols and characters.

The control unit 21 further includes a memory 215 for managing the progress of a game. The memory 215 holds key arrangement information, input trajectory information, and game progress information.

The key arrangement information includes data on key identifiers, arrangement positions, and keys.

The key identifier data area records therein data on identifiers for identifying polygonal icons 521.

The arrangement position data area records therein data on arrangement positions (coordinates) of the polygonal icons 521.

The key data area records therein data on keys allocated to the polygonal icons 521.

The input trajectory information includes data on keys (input keys) allocated to the polygonal icons 521 selected in the operation area 520 in the game view 500. In the present embodiment, a key sequence is generated in which one or more keys selected by an input trajectory drawn with a single stroke between user's touch on and release from the screen of the touch panel display 25 are sequentially recorded between the touch and the release. The key sequence may include only one single key.

The game progress information includes data on attack right setting and life point of each player. The game progress information is registered when the user starts a game, and is deleted when he/she terminates the game.

The player data area records therein data on an identifier for identifying a player (opponent) with whom the user plays a game. The present embodiment assumes that the user (first player) of the user device 20 plays a game with a computer (second player). In this case, the player data area for game progress information in the memory 215 records therein an identifier for identifying a "computer" as the opponent.

The attack right setting data area records therein a flag for identifying the attacking player out of the first and second players. In the present embodiment, the attacking player can attack the opponent (defending player).

The life point data area records therein data on elements (life point) for determining winning/losing of a one-on-one fighting game. In the present embodiment, the life point of the defending player decreases due to attacks. When the life point of the player earlier reaches a reference value (of "0", for example) or less than the opponent, the player loses.

The storage unit 22 stores battle view information, operation view information, and a list of commands therein.

The battle view information includes information for defining player images and the like displayed in the battle display area 510.

The operation view information includes information for defining polygonal icons 521 and the like displayed in the operation area 520.

The list of commands includes information for defining execution key, attack ability, attack animation and the like for each attack command.

The attack command data area records therein data on identifiers for identifying types of attacks.

The execution key data area records therein data on keys (key sequences) required to execute attacks. For example, the key sequences such as "K", "P", "down→lower right right→P", and "down→lower left→left→K" are recorded as the execution keys.

The attack ability data area records therein data on attack ability, that is, damages subjected to the defending player. Continuous attacks ("combo"), in which a plurality of attack commands is combined, may be executed in one input trajectory. When one attack command is combined with another attack command in the continuous attacks, an adjustment value for changing corresponding attack ability is recorded. For example, attack ability of an attack command increases depending on the adjustment value.

The attack animation data area records therein data on animations displayed in the battle display area 510. The animations indicate the contents of attacks of the players.

Figure 3:
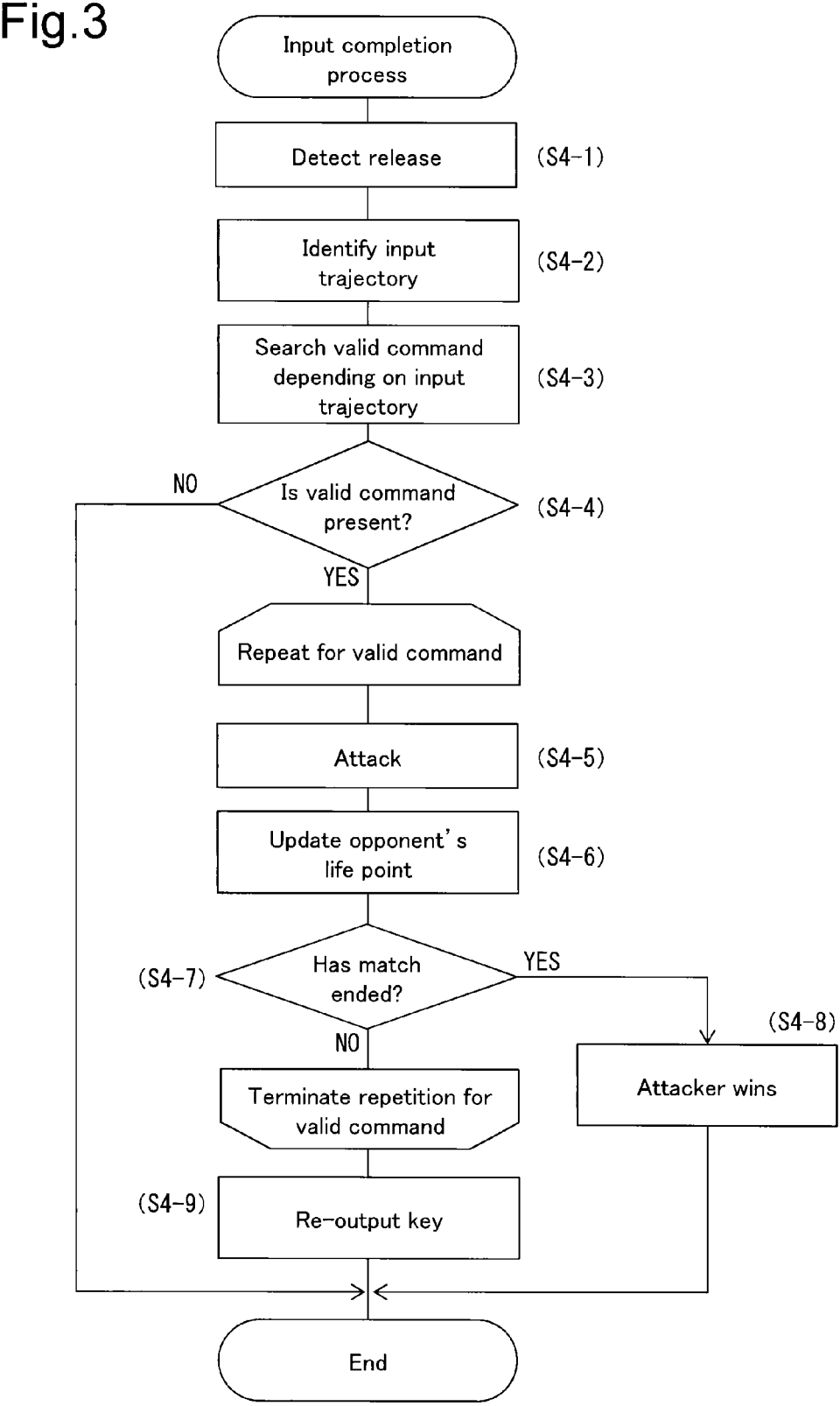
FIG. 3 is an explanatory diagram of processes in the system of FIG. 1.

The processes in the control unit 21 during a game will be described below. Herein, the description will be made in the order of an activation process (FIG. 2A), a tap process (FIG. 2B), an input operation process (FIG. 2C), a time limit management process (FIG. 2D) and an input completion process (FIG. 3).

Activation Process

The activation process will be first described with reference to FIGS. 2A and 5A to 5D. When playing a one-on-one fighting game, the user activates the game application in the user device 20.

In this case, the control unit 21 in the user device 20 performs a game view display process (step S0-1). Specifically, the display control unit 211 in the control unit 21 outputs the game view 500 including the battle display area 510 and the operation area 520 on the screen of the touch panel display 25.

The control unit 21 then performs a key output process (step S0-2). Specifically, the game management unit 213 in the control unit 21 randomly allocates a key to each polygonal icon 521, and stores the allocated key in the memory 215 in association with the polygonal icon 521. The display control unit 211 outputs an identifier indicating the key in the information display area 522 in each polygonal icon 521.

Figure 5A:
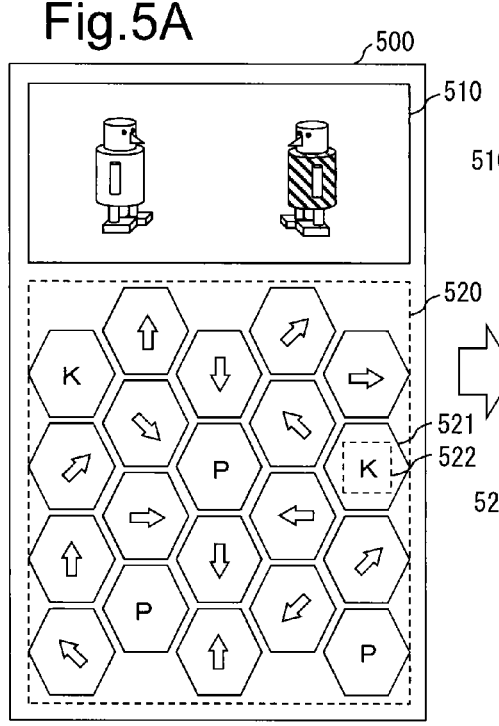
FIG. 5A is an explanatory diagram of display contents on activation in the game view of FIG. 4A.

In this case, as illustrated in FIG. 5A, the identifiers indicating the allocated keys are displayed in the information display areas 522 in the game view 500, respectively.

Tap Process

The tap process (identifier changing process) will be described below with reference to FIGS. 2B and 4B. When changing a key, the player taps (performs the tap operation on) a polygonal icon 521 with a finger. That is, the user touches the screen of the touch panel display 25 with a finger, and releases the finger within a predetermined time without moving the finger from the touch position on the screen.

In this case, the control unit 21 performs a tap detection process (step S1-1). Specifically, when the display control unit 211 detects a user's touch at a first position on the screen of the touch panel display 25, and detects release within a predetermined short time without any motion of the touch position from the first position, the user operation is determined as tap operation.

The control unit 21 then performs a key changing process (step S1-2). Specifically, the management unit 213 randomly re-allocates a key to the tapped polygonal icon 521, and stores the allocated key in association with the tapped polygonal icon 521 in the memory 215. The display control unit 211 outputs an identifier indicating the key into each information display area 522.

In this case, as illustrated in FIG. 4B, each information display area 522 displays a randomly-changed key therein. Herein, the user can repeatedly perform the tap operation several times such as one tap or two taps until a desired key is displayed.

Input Operation Process

The input operation process will be described below with reference to FIGS. 2C and 5A to 5D. Herein, the user confirms an arrangement of the keys allocated to the polygonal icons 521 in the game view 500 displayed on the screen of the touch panel display 25. The user searches execution keys (key sequence) corresponding to a predetermined attack command in the key arrangement. When finding execution keys, the user performs the touch operation on the first key in the execution keys on the screen of the touch panel display 25.

When the touch operation is performed, the control unit 21 performs a touch detection process (step S2-1). Specifically, the operation management unit 212 in the control unit 21 detects a touch on the screen of the touch panel display 25. The operation management unit 212 stores the key allocated to the touched polygonal icon 521 in the memory 215.

The control unit 21 then performs a reduced display process (step S2-2). Specifically, the display control unit 211 displays the selected polygonal icons 521 to be reduced in their size at a predetermined rate. When the user returns the finger onto the previously-input trajectory without releasing the finger from the screen of the touch panel display 25, that is, re-touches the previously-touched polygonal icon 521, the display control unit 211 displays the re-touched polygonal icon 521 in the original size.

Figure 5B:
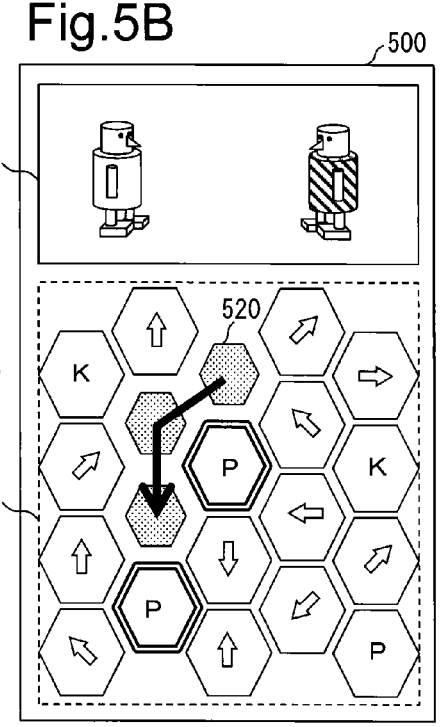
FIG. 5B is an explanatory diagram of display contents on trajectory input in the game view of FIG. 4A.

FIG. 5B illustrates a case in which the user selects with a single stroke three polygonal icons 521, that is, the user selects three polygonal icons 521 from the touch operation to the release operation. At this time, the selected polygonal icons 521 on the input trajectory are displayed in a reduced size in the game view 500.

The control unit 21 then performs a valid combination search process based on the input trajectory (step S2-3). Specifically, the display control unit 211 identifies a key sequence of the input keys stored in the memory 215. The display control unit 211 searches an execution key matching with the head of the key sequence in the list of commands stored in the storage unit 22.

The control unit 21 then performs a determination process as to whether the command can be completed (step S2-4). Specifically, when being able to detect an attack execution key matching with the head of the key sequence, the display control unit 211 identifies the next key missing in the execution key. Then, the display control unit 211 identifies all the polygonal icons 521 (peripheral graphic forms) adjacent to the final position (the last-selected polygonal icon 521) in the input trajectory. The display control unit 211 identifies the keys (adjacent keys) allocated to the specified polygonal icons 521. The display control unit 211 checks whether the adjacent keys include a key (next key) required to complete the execution key. When the adjacent keys include a next key, the display control unit 211 determines that the command can be completed. In contrast, when the adjacent keys do not include a next key, the display control unit 211 determines that the command cannot be completed.

When the display control unit 211 determines that the command cannot be completed ("NO" in step S2-4), the control unit 21 returns the control to the touch detection process (step S2-1).

In contrast, when the display control unit 211 determines that the command can be completed ("YES" in step S2-4), the control unit 21 performs a hint output process (step S2-5). Specifically, the operation management unit 212 displays a polygonal icon 521 allocated with the next key among the polygonal icons 521 adjacent to the last-selected polygonal icon 521 in an emphasizing manner (hint display). Thereby, the user can identify the polygonal icon 521 allocated with the next key.

FIG. 5B illustrates two possibilities in which the execution key can be completed by a key sequence of polygonal icons 521 in an input trajectory. More specifically, two of the polygonal icons 521 adjacent to the last-selected polygonal icon 521 are allocated with the "P" key. When "P" is selected as the next key for the key sequence of "down→lower right→right", the execution key is completed. In this case, the polygonal icons 521 allocated with the next key are displayed in an emphasizing manner by double-line surrounding. The process returns to the touch detection process (step S2-1).

Time Limit Management Process

The time limit management process will be described below with reference to FIG. 2D.

Herein, the control unit 21 performs an attackable period countdown process (step S3-1). Specifically, the management unit 213 measures an elapsed time after the start of an attackable period of the attacking player.

The control unit 21 then performs a determination process as to whether the attackable period has ended (step S3-2). Specifically, the management unit 213 compares the elapsed time with the attack time limit. When the elapsed time reaches the attack time limit, the management unit 213 determines that the attackable period has ended.

When the elapsed time has not reached the attack time limit, the management unit 213 determines that the attackable period has not ended ("NO" in step S3-2). In this case, the control unit 21 continues the attack time limit countdown process (step S3-1).

In contrast, when the elapsed time reaches the attack time limit, the management unit 213 determines that the attackable period has ended ("YES" in step S3-2). In this case, the control unit 21 performs an attacking player changing process (step S3-3). Specifically, the management unit 213 transfers the right to attack to the opponent player in the game progress information recorded in the memory 215 so that the right to attack is set for the opponent player. In this case, the key output process (step S0-2) is performed again for the opponent.

Input Completion Process

The input completion process at the end of an input trajectory drawn with a single stroke will be described below with reference to FIGS. 3 and 5A to 5D. When completing inputting a desired key sequence, the user performs the release operation of releasing the finger from the touch panel display 25.

In this case, the control unit 21 performs a release detection process (step S4-1). Specifically, the operation management unit 212 detects a release of the finger touching on the screen of the touch panel display 25.

The control unit 21 then performs an input trajectory identifying process (step S4-2). Specifically, the management unit 213 identifies a key sequence of input keys based on the input trajectory information stored in the memory 215.

The control unit 21 then performs a valid command search process depending on an input trajectory (step S4-3). Specifically, the management unit 213 searches an attack command corresponding to a key sequence in the list of commands in the storage unit 22. In this case, the game management unit 213 first tries to identify an execution key of an attack command with the first key in the key sequence as the origin. When successfully identifying an execution key of one attack command, the game management unit 213 checks whether an additional execution key is included in the rest of the key sequence. The game management unit 213 identifies all the execution keys included in the key sequence configuring the input trajectory.

The control unit 21 then performs a determination process as to whether at least one attack command can be identified in the key sequence, that is, the key sequence includes a valid command (step S4-4). Specifically, the management unit 213 confirms whether at least one attack command can be identified in the key sequence. Wen successfully identifying at least one attack command in the key sequence, the management unit 213 determines that the key sequence includes a valid command.

When failing to identify an attack command in the key sequence, the management unit 213 determines that the key sequence does not include a valid command ("NO" in step S4-4). In this case, the control unit 21 terminates the input completion process.

In contrast, when the management unit 213 determines that the key sequence includes a valid command ("YES" in step S4-4), the control unit 21 repeatedly performs the following processes on the identified attack command (valid command).

At first, the control unit 21 performs an attack process (step S4-5). Specifically, the management unit 213 executes an attack command corresponding to the valid command. In this case, the display control unit 211 outputs an attack animation depending on an attack from the attacking player to the defending player in the battle display area 510.

The control unit 21 then performs an opponent's life point update process (step S4-6). Specifically, the management unit 213 determines attack ability associated with a current attack command in the list of commands recorded in the storage unit 22. Herein, when the current attack command is the second or subsequent attack command in the continuous attacks, the game management unit 213 determines an adjustment value associated with the current attack command in the list of commands, and changes (increases, for example) the attack ability by use of the adjustment value. The game management unit 213 determines life point of the defending player in the game progress information recorded in the memory 215. The game management unit 213 calculates a value obtained by subtracting the attack ability from the life point of the defending player, and updates the life point of the defending player by use of the calculated value.

The control unit 21 then performs a determination process as to whether the match has ended (step S4-7). Specifically, the management unit 213 compares the life point of the defending player with a reference value (which is 0, herein). When the life point reaches the reference value or less, the management unit 213 determines that the match has ended.

When the management unit 213 determines that the match has ended ("YES" in step S4-7), the control unit 21 performs an attacking player winning process (step S4-8). Specifically, the management unit 213 determines the attacking player as a winner. In this case, the display control unit 211 outputs a winner animation in the image display area of the attacking player and a loser animation in the image display area of the defending player in the battle display area 510.

In contrast, when the life point of the defending player remains, the management unit 213 determines that the match has not ended. In this case ("NO" in step S4-7), the control unit 21 repeatedly performs the processes in and subsequent to step S4-5 on the remaining valid commands.

Figure 5C:
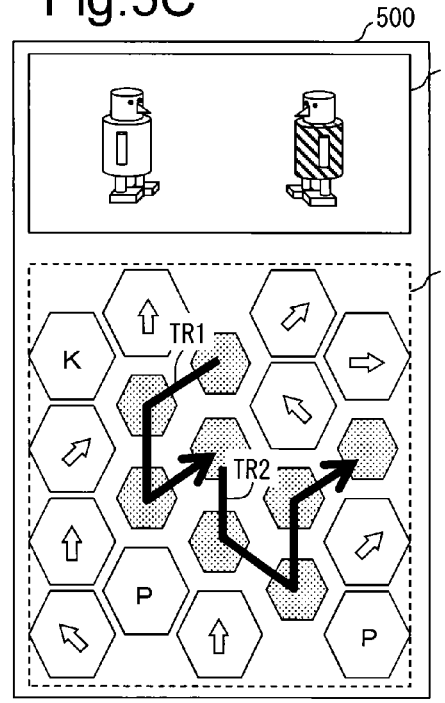
FIG. 5C is an explanatory diagram of display contents immediately after release in the game view of FIG. 4A.

In FIG. 5C, it is assumed that two input trajectories TR1 and TR2 are detected from touch to release in the input trajectories including eight polygonal icons 521. Herein, the key sequence of the input trajectory TR1 is "down"→"lower right"→"right"→"P", and the key sequence of the input trajectory TR2 is "down"→"lower left"→"left"→"K". In this case, the attack commands corresponding to the input trajectories TR1 and TR2 are executed as continuous attacks.

Figure 5D:
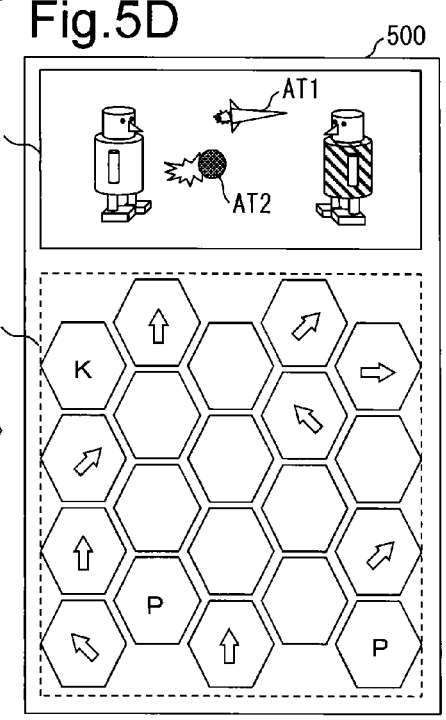
FIG. 5D is an explanatory diagram of display contents on attack in the game view of FIG. 4A.

As illustrated in FIG. 5D, an attack on the player image 512 of the defending player is made from the player image 511 of the attacking player. Herein, an attack AT1 based on the input trajectory TR1 and an attack AT2 based on the input trajectory TR2 are sequentially made.

When terminating the process on all the valid commands, the control unit 21 performs a key re-output process (step S4-9). Specifically, the management unit 213 randomly allocates keys to the polygonal icons 521 on an input trajectory. The display control unit 211 outputs an identifier indicating an allocated key in the information display area 522 in each polygonal icon 521, and terminates the input completion process.

Computer Match Process

An attack process when the opponent is a computer and the computer is the attacking player will be described. In this case, the management unit 213 searches an execution key of an attack command in the key arrangement allocated in the operation area 520 in the touch panel display 25. An attack command is repeated from an execution key with the strongest attack ability within an attackable period. When the opponent is a computer and the computer is the attacking player, the keys are not permitted to change in the tap process by the user.

The above described embodiment achieves the following advantages.

(1) The player images 511 and 512 of the game players are displayed in the battle display area 510. A plurality of polygonal icons 521 is displayed in the operation area 520. Each polygonal icon 521 is arranged adjacent to other polygonal icons 521. The sides of each polygonal icon 521 oppose the corresponding sides of other adjacent polygonal icons 521. Accordingly, the user continuously selects a plurality of polygonal icons 521 with drawing motion with a single stroke thereby inputting a command in a key sequence.

(2) Each polygonal icon 521 is provided with the information display area 522, in which an identifier indicating an allocated key is displayed. Thereby, the user can input a command by use of a combination of polygonal icons 521 with various information displayed therein. For example, the user can select various attacks by selecting a key subsequent to another key.

In addition, the control unit 21 performs the key changing process in the tap process (step S1-2). Thereby, the user can change the keys allocated to the polygonal icons 521 as desired, thereby facilitating a valid command in the key sequence to be established.

(3) The control unit 21 performs the reduced display process (step S2-2). Thereby, the user can identify an input trajectory. Further, when detecting a return of the finger on the input trajectory, that is, a retouch on a polygonal icon 521, the display control unit 211 returns the retouched polygonal icon 521 to the original size. Thereby, the user can re-select a polygonal icon 521.

(4) When the display control unit 211 determines that the command can be completed ("YES" in step S2-4), the control unit 21 performs the hint output process (step S2-5). Thereby, even when not knowing the execution key of an attack command well, the user can enjoy the game by use of hints.

(5) When the elapsed time reaches the attack time limit and the management unit 213 determines that the attackable period has ended ("YES" in step S3-2), the control unit 21 performs the attacking player changing process (step S3-3). Thereby, the user can enjoy the game with a feeling of speed in the time limit.

(6) When the management unit 213 determines that the key sequence includes a valid command ("YES" in step S4-4), the control unit 21 repeatedly performs the attack process (step S4-5) on the identified attack command (valid command). Thereby, the user can repeat continuous attacks as a combination of attacks by a single drawing action with a single stroke.

<Second Embodiment>

A second embodiment will be described below with reference to FIGS. 6C to 8D. In the first embodiment, the control unit 21 outputs a hint to a polygonal icon allocated with a key for which an attack command can be executed. In the second embodiment, the control unit 21 sets a non-displayed command (hidden command) in a polygonal icon. A detailed description of the similar parts will be omitted.

In the present embodiment, the user can select polygonal icons 521 with the same pattern or color, that is, with the same identifier, through a drawing action with a single stroke. Also in the second embodiment, the tap process and the time limit management process are performed, and the right to attack is transferred and set based on the attack time limit.

In the present embodiment, when the attacking player selects a polygonal icon 521 (hidden command graphic) set with a hidden command, unfavorable progress of the game (such as losing) against the attacking player is caused. A polygonal icon 521 set with a hidden command is displayed in the same form as the normal polygonal icons 521. Therefore, the user cannot determine the presence of a hidden command in a polygonal icon 521 by appearance.

In the present embodiment, the key arrangement information further records a hidden cell flag and a hint cell flag in association with a key identifier.

The hidden cell flag is designed for identifying a polygonal icon 521 set with a hidden command.

The hint cell flag is designed for identifying a polygonal icon 521 (hint display graphic) displaying a hint for a hidden command. In the present embodiment, the polygonal icon 521 with a hint cell displays the number of polygonal icons 521 set with hidden commands (positional relationship information) among the polygonal icons 521 adjacent to the polygonal icon with a hint cell.

Similarly as in FIG. 4A, the game view 500 includes the battle display area 510 and the operation area 520. A plurality of polygonal icons 521 is displayed in the operation area 520. Each polygonal icon 521 is arranged adjacent to other polygonal icons 521. More specifically, the sides of each polygonal icon 521 oppose the corresponding sides of its adjacent polygonal icons 521. The user moves (swipes) the position touched by a finger or another input tool on the screen of the touch panel display 25 with a single stroke, thereby selecting a series of adjacent polygonal icons 521 along the input trajectory drawn with a single stroke. That is, the user can select the polygonal icons 521 depending on the input trajectory by the swipe operation on the screen of the touch panel display 25.

Further, each polygonal icon 521 is provided with an information display area 522 displaying a hint therein. A hint is displayed in the information display area 522 in a polygonal icon 521 adjacent to the input trajectory. In the present embodiment, the number of polygonal icons 521 set with hidden commands among the polygonal icons 521 adjacent to the polygonal icon 521 with a hint is displayed.

The list of commands in the storage unit 22 according to the present embodiment includes attack ability functions for determining attack ability of attack commands. The attack ability functions calculate attack ability depending on attributes (pattern and color) and the number of keys allocated to the polygonal icons 521, for example.

Activation Process

An activation process will be described with reference to FIGS. 6A and 8A to 8D. When playing a one-on-one fighting game, the user activates the game application in the user device 20.

In this case, the control unit 21 performs a game view display process (step S5-1). Specifically, the display control unit 211 outputs the game view 500 including the battle display area 510 and the operation area 520 on the screen of the touch panel display 25.

The control unit 21 then performs a hidden key setting process (step S5-2). Specifically, the management unit 213 allocates a hidden command to a randomly-selected polygonal icon 521. The game management unit 213 records information on the polygonal icon 521 (hidden cell) set with a hidden cell flag in the key arrangement information in the memory 215.

The control unit 21 then performs a key output process (step S5-3). Specifically, the management unit 213 randomly allocates a key (pattern and color) to each polygonal icon 521. The display control unit 211 outputs an identifier indicating a key on the top of each polygonal icon 521.

Figure 8A:
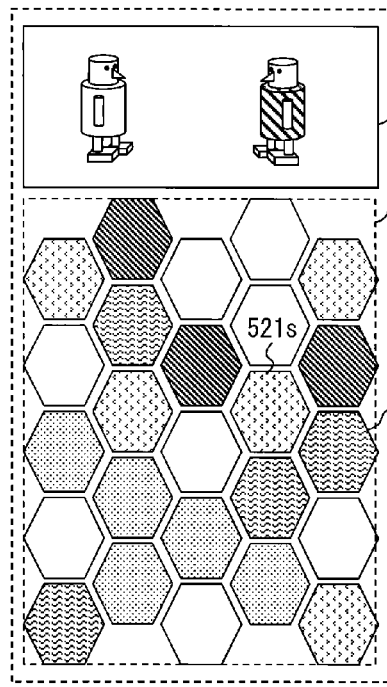
FIG. 8A is an explanatory diagram of display contents on activation in a game view according to the second embodiment.

In this case, as illustrated in FIG. 8A, in the game view 500, an identifier (pattern and color) indicating an allocated key is displayed in each polygonal icon 521. There will be herein assumed a case in which a hidden command is allocated to a polygonal icon 521s.

Input Operation Process

An input operation process will be described below with reference to FIGS. 6B and 8A to 8D. Herein, the user checks the arrangement of a key allocated to each polygonal icon 521 in the game view 500 displayed on the screen of the touch panel display 25. The user searches an execution key (key sequence) corresponding to a predetermined attack command in the key arrangement. When finding an execution key, the user performs the touch operation on the screen of the touch panel display 25.

When the touch operation is performed, the control unit 21 performs a touch detection process (step S6-1). Specifically, the operation management unit 212 detects a touch on the screen of the touch panel display 25. The operation management unit 212 stores a key allocated to the touched polygonal icon 521 in the memory 215.

The control unit 21 then performs a reduced display process (step S6-2). Specifically, the display control unit 211 displays the selected polygonal icons 521 reduced in their size at a predetermined rate.

Figure 8B:
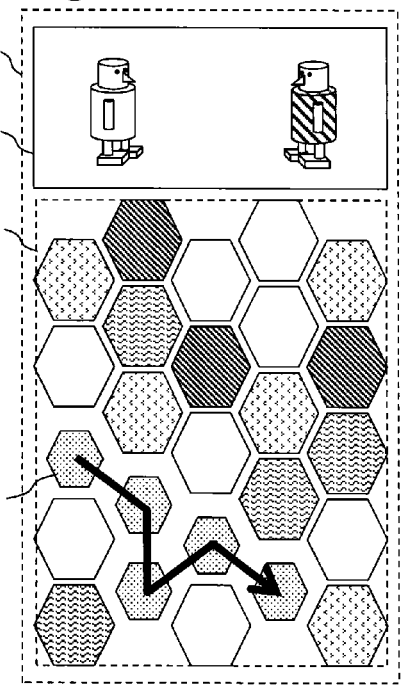
FIG. 8B is an explanatory diagram of display contents on trajectory input in the game view according to the second embodiment.

FIG. 8B illustrates a case in which the user selects five polygonal icons 521 with a single stroke. In this case, in the game view 500, the selected polygonal icons 521 on the input trajectory are reduced in their size to be displayed.

Hint Process

Figure 6A:
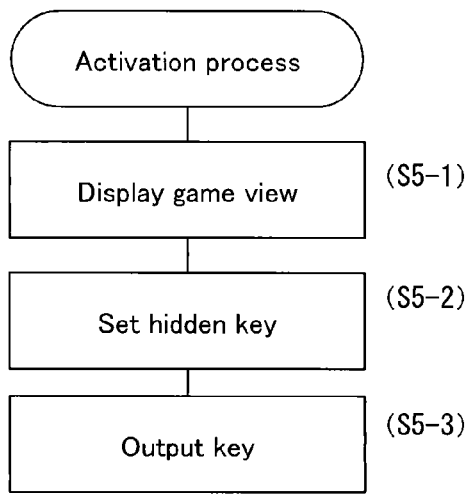
FIG. 6A is an explanatory diagram of an activation process in a system according to a second embodiment.
Figure 6B:
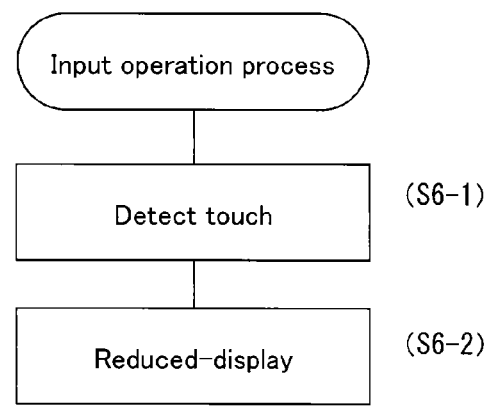
FIG. 6B is an explanatory diagram of an input operation process in the system according to the second embodiment.
Figure 6C:
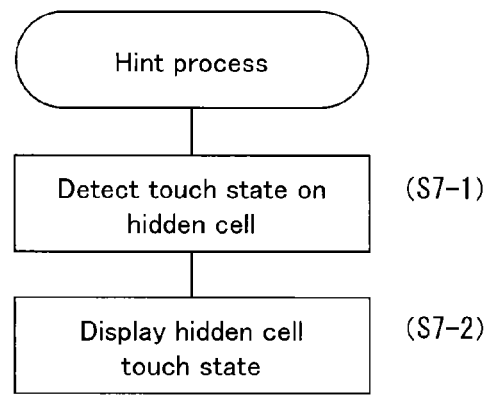
FIG. 6C is an explanatory diagram of a hint process in the system according to the second embodiment.

A hint process will be described with reference to FIG. 6C.

Herein, the control unit 21 performs a process of detecting a touch state on a hidden cell (step S7-1). Specifically, the management unit 213 identifies a polygonal icon 521 (hint cell) recording a hint cell flag therein in the key arrangement information in the memory 215. The game management unit 213 calculates the number of polygonal icons 521 (hidden cells) set with hidden cell flags (the number of touched hidden cells) among the polygonal icons 521 adjacent to the hint cell.

The control unit 21 then performs a hidden cell touch state display process (step S7-2). Specifically, the display control unit 211 outputs the number of touched hidden cells calculated in the game management unit 213 to the information display area 522 in each polygonal icon 521 with a hint cell.

Input Completion Process

An input completion process will be described below with reference to FIGS. 7 and 8A to 8D. When completing inputting a desired key sequence, the user performs a release operation of releasing the finger from the touch panel display 25.

In this case, the control unit 21 performs a release detection process similarly as in step S4-1.

The control unit 21 then performs an input trajectory identifying process similarly as in step S4-2.

The control unit 21 then performs a determination process as to whether a hidden key is present on an input trajectory (step S8-3). Specifically, the management unit 213 uses the key arrangement information recorded in the memory 215 to confirm whether a hidden cell flag is set in the selected polygonal icons 521.

When the management unit 213 determines that a hidden key is present on the input trajectory ("YES" in step S8-3), the control unit 21 performs an attacking player defeat process (step S8-4). Specifically, the management unit 213 identifies the attacking player as a loser. In this case, the display control unit 211 outputs a loser animation in the image display area of the attacking player and a winner animation in the image display area of the defending player in the battle display area 510.

In contrast, when the management unit 213 determines that a hidden key is not present on the input trajectory ("NO" in step S8-3), the control unit 21 performs a process of changing to a hint cell around the input trajectory (step S8-5). Specifically, the management unit 213 sets a hint cell flag to the polygonal icons 521 around the input trajectory in the key arrangement information.

Figure 8C:
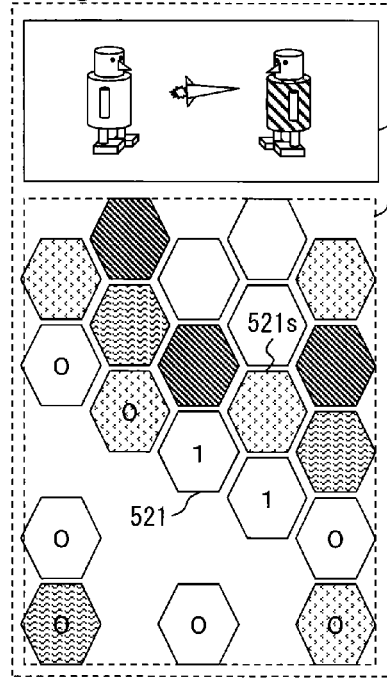
FIG. 8C is an explanatory diagram of display contents immediately after release in the game view according to the second embodiment.

In FIG. 8C, a hidden cell flag is set in polygonal icons 521 adjacent to the input trajectory in the game view 500. With the hint process described above, a hint is displayed in the information display area 522 in the polygonal icon 521 set with a hint cell flag. Herein, since the polygonal icon 521s is a hidden cell, "1" is displayed in the polygonal icons 521 adjacent thereto. In contrast, "0" is displayed in the polygonal icons 521 non-adjacent to the hidden cell.

The control unit 21 then performs an attack ability calculation process based on an input trajectory (step S8-6). Specifically, the management unit 213 calculates attack ability by use of an attack ability function recorded in the list of commands.

The control unit 21 then performs a cell erase process on an input trajectory (step S8-7). Specifically, the management unit 213 erases the polygonal icons 521 on an input trajectory in the operation area 520.

The control unit 21 then performs an attack process (step S8-8). Specifically, the management unit 213 executes an attack command corresponding to a valid command specified in the list of commands. In this case, the display control unit 211 outputs an attack animation depending on an attack from the attacking player to the defending player in the battle display area 510.

The control unit 21 then performs an opponent's life point update process similarly as in step S4-6 (step S8-9).

The control unit 21 then performs a determination process as to whether the match has ended similarly as in step S4-7 (step S8-10).

When the management unit 213 determines that the match has ended ("YES" in step S8-10), the control unit 21 performs an attacking player winning process similarly as in step S4-8 (step S8-11).

When the management unit 213 determines that the match has not ended ("NO" in step S8-10), the control unit 21 performs a cell movement/addition process depending on an erased cell (step S8-12). Specifically, the display control unit 211 moves the remaining polygonal icons 521 to fill the spaces of the erased polygonal icons 521 on the input trajectory. Further, the display control unit 211 adds polygonal icons 521 to fill the empty cells. The game management unit 213 randomly allocates new keys to the added polygonal icons 521. In this case, the polygonal icon 521 with a hint cell is subjected again to the hint process.

Figure 8D:
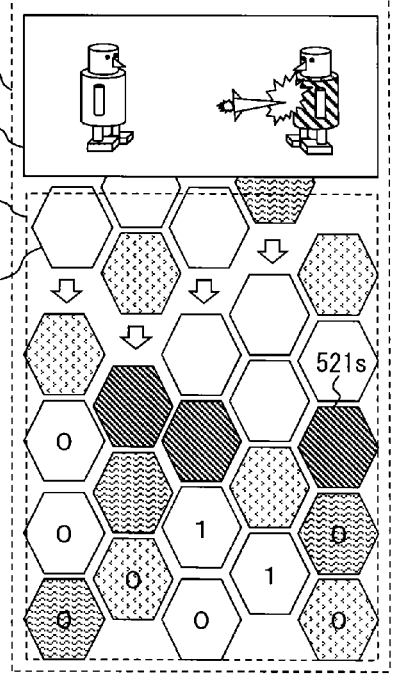
FIG. 8D is an explanatory diagram of display contents on attack in the game view according to the second embodiment.

In FIG. 8D, the polygonal icons 521 are erased on the input trajectory, and upper polygonal icons 521 are moved downward. Further, new polygonal icons 521 are inserted at the upper end of the operation area 520. Also in this case, the newly-inserted polygonal icons 521 are randomly set with hidden keys in the hidden key setting process (step S5-2). A hint is displayed depending on the number of neighboring touched hidden cells in the polygonal icons 521 recording hint cell flags therein.

According to the second embodiment, the following advantages are obtained in addition to the advantages of the first embodiment.

(7) The control unit 21 performs the hidden key setting process (step S5-2). This allows the user to enjoy the game by use of the setting other than the keys allocated on the screen of the touch panel display 25.

(8) The control unit 21 performs the process of detecting a touch state on a hidden cell (step S7-1). The control unit 21 performs the hidden cell touch state display process (step S7-2). This allows the user to select an attack command while predicting the position of a hidden key by use of a hint.

The above described embodiments may be modified as follows.

In the first and second embodiments, a plurality of polygonal icons 521 is displayed in the operation area 520. The shape of icons to be subjected to trajectory input is not limited to polygonal. Any shapes capable of continuously selecting and identifying a trajectory with drawing motion on adjacent icons with a single stroke may be employed, such as circular shape, and characters or symbols allocated to keys.

In the first and second embodiments, the opponent of the user is a computer. Instead, the user may play a game with another user. In this case, a management server for managing social network games is accessed. In this case, the management server identifies two users who play a game, and performs the input operation process and the input completion process.

In the first and second embodiments, the right to attack is transferred and set based on an attack time limit in the time limit management process. Instead, the right to attack may be transferred and set per input completion process. In this case, when terminating the input completion process, the control unit 21 transfers and sets the right to attack to the other party.

Further, the attack time limit may be changed depending on capabilities of the players. In this case, the capabilities of the players are determined depending on user's skills or use frequencies (user attributes). Specifically, the storage unit 22 stores user attribute information on skills and use frequencies. Further, the game management unit 213 stores time limit calculation information for determining the attack time limit based on skills and use frequencies. The game management unit 213 determines the attack time limit by use of the time limit calculation information.

Moreover, when the opponent is a computer, the right to attack may be transferred and set depending on not the attack time limit but the number of attack limitations. In this case, the game management unit 213 counts the number of terminations of the input completion process. When the number of terminations reaches a predetermined number of times, the game management unit 213 transfers and sets the right to attack to the other party.

In the first and second embodiments, an attack command is identified based on the keys allocated to the selected polygonal icons 521 on an input trajectory. Additionally, the attack contents may be changed by the shape (gesture) of the input trajectory. In this case, the storage unit 22 records correction functions for adjusting the attack ability in association with input trajectory patterns. For example, when the input trajectory is a straight line shape, a correction function for increasing the attack ability is employed. The attack ability is adjusted based on a correction function depending on a shape of the input trajectory.

In the first and second embodiments, a symbol, character or color is displayed as an identifier indicating a key in a polygonal icon 521. The identifiers of the keys displayed in polygonal icons 521 are not limited thereto. In this case, combinations of keys displayed in the polygonal icons 521 are recorded as execution keys in the list of commands. A predetermined word (such as magic spell or actual word) may be used in a key sequence on an input trajectory. In this case, attributes (category or difficulty level) of a magic spell or actual word are identified, and the attack ability is calculated based on the attributes. When a combination of keys in the input trajectory matches with the execution key, the attack command is executed.

In the first and second embodiments, the control unit 21 performs the key changing process by the tap process (step S1-2). In the key changing process, keys to be allocated are randomly changed. Instead, the keys may be changed in a predetermined order. In this case, a key output order ("up"→"upper right"→"right"→"lower right"→"down"→ . . . →"K (kick)", for example) is previously determined. Thereby, the user can change the keys in consideration of the rule.

When a key is changed in the tap process, penalties (unfavorable conditions for match) may be provided. In this case, the game management unit 213 stores therein penalty information for determining a penalty. The penalties may include decrease in attack ability of a valid command, increase in damages by opponent (decrease in life point), reduction in attack time limit, and the like. The game management unit 213 determines a penalty depending on the number of taps, and makes the match in consideration of the penalty. Thereby, the user can play the game in consideration of easily established valid command by the tap process, and disadvantages thereof.

In the first embodiment, when determining that a command can be completed ("YES" in step S2-4), the control unit 21 performs the hint output process (step S2-5). Herein, a polygonal icon 521 in which a key required to complete an execution key is displayed is emphasized for display to be identifiable. The hint display method is not limited thereto. For example, the attack commands recorded in the list of commands may be displayed in association with the polygonal icons 521.

Figure 9:
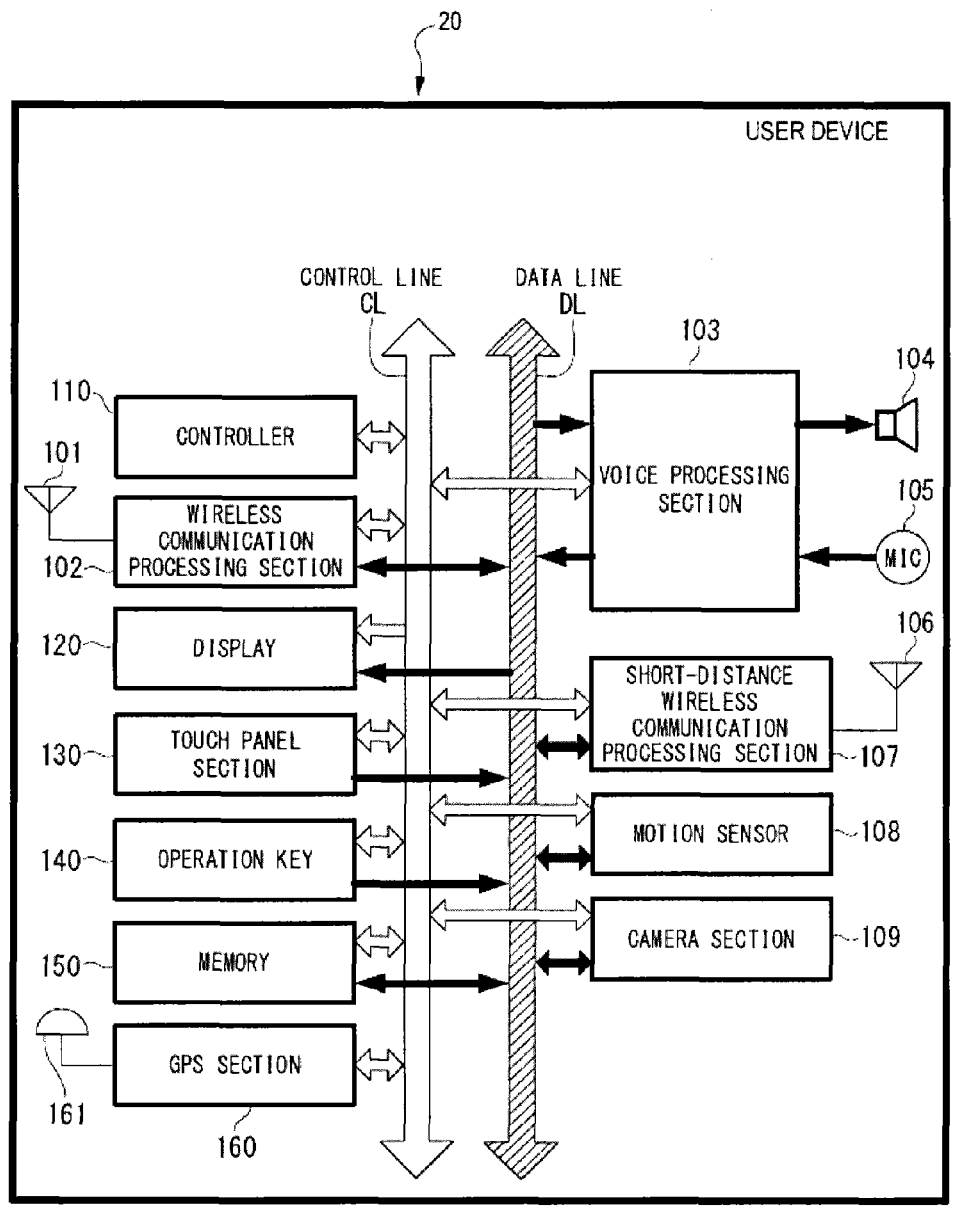
FIG. 9 is a more detailed hardware block diagram illustrating an exemplary electronic device according to the embodiments.

FIG. 9 is a more detailed block diagram illustrating an exemplary user device 20 according to certain embodiments of the present disclosure. In certain embodiments, user device 20 may be a smartphone. However, the skilled artisan will appreciate that the features described herein may be adapted to be implemented on other devices (e.g., a laptop, a tablet, a server, an e-reader, a camera, a navigation device, etc.). The exemplary user device 20 of FIG. 9 includes a controller 110 and a wireless communication processor 102 connected to an antenna 101. A speaker 104 and a microphone 105 are connected to a voice processor 103.

The controller 110 is an example of the control unit 21 shown in FIG. 1 and may include one or more Central Processing Units (CPUs), and may control each element in the user device 20 to perform functions related to communication control, audio signal processing, control for the audio signal processing, still and moving image processing and control, and other kinds of signal processing. The controller 110 may perform these functions by executing instructions stored in a memory 150. Alternatively or in addition to the local storage of the memory 150, the functions may be executed using instructions stored on an external device accessed on a network or on a non-transitory computer readable medium. As described above in relation to FIG. 1, the controller 110 may execute instructions allowing the controller 110 to function as the display control unit 211, operation management unit 212 and game management unit 213 depicted in FIG. 1.

The memory 150 is an example of the storage unit 22 shown in FIG. 1 and includes but is not limited to Read Only Memory (ROM), Random Access Memory (RAM), or a memory array including a combination of volatile and non-volatile memory units. The memory 150 may be utilized as working memory by the controller 110 while executing the processes and algorithms of the present disclosure. Additionally, the memory 150 may be used for long-term storage, e.g., of image data and information related thereto. As disclosed in relation to FIG. 1, the memory 150 may be configured to store the battle view information, operation view information and list of commands.

The user device 20 includes a control line CL and data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The wireless communication processor 102 controls the communication performed between the user device 20 and other external devices via the antenna 101. For example, the wireless communication processor 102 may control communication between base stations for cellular phone communication.

The speaker 104 emits an audio signal corresponding to audio data supplied from the voice processor 103. The microphone 105 detects surrounding audio and converts the detected audio into an audio signal. The audio signal may then be output to the voice processor 103 for further processing. The voice processor 103 demodulates and/or decodes the audio data read from the memory 150 or audio data received by the wireless communication processor 102 and/or a short-distance wireless communication processor 107. Additionally, the voice processor 103 may decode audio signals obtained by the microphone 105.

The exemplary user device 20 may also include a display 120, a touch panel 130, an operation key 140, and a short-distance communication processor 107 connected to an antenna 106. The display 120 may be a Liquid Crystal Display (LCD), an organic electroluminescence display panel, or another display screen technology. In addition to displaying still and moving image data, the display 120 may display operational inputs, such as numbers or icons which may be used for control of the user device 20. The display 120 may additionally display a GUI for a user to control aspects of the user device 20 and/or other devices. Further, the display 120 may display characters and images received by the user device 20 and/or stored in the memory 150 or accessed from an external device on a network. For example, the user device 20 may access a network such as the Internet and display text and/or images transmitted from a Web server.

The touch panel 130 may include a physical touch panel display screen and a touch panel driver. The touch panel 130 may include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

One or more of the display 120 and the touch panel 130 are examples of the touch panel display 25 depicted in FIG. 1 and described above.

In certain aspects of the present disclosure, the touch panel 130 may be disposed adjacent to the display 120 (e.g., laminated) or may be formed integrally with the display 120. For simplicity, the present disclosure assumes the touch panel 130 is formed integrally with the display 120 and therefore, examples discussed herein may describe touch operations being performed on the surface of the display 120 rather than the touch panel 130. However, the skilled artisan will appreciate that this is not limiting.

For simplicity, the present disclosure assumes the touch panel 130 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's finger around an edge of the display panel 120 (e.g., gripping a protective case that surrounds the display/touch panel). Signals may be transmitted by the touch panel driver, e.g. in response to a detection of a touch operation, in response to a query from another element based on timed data exchange, etc.

The touch panel 130 and the display 120 may be surrounded by a protective casing, which may also enclose the other elements included in the user device 20. In certain embodiments, a position of the user's fingers on the protective casing (but not directly on the surface of the display 120) may be detected by the touch panel 130 sensors. Accordingly, the controller 110 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 110 may be configured to detect which hand is holding the user device 20, based on the detected finger position. For example, the touch panel 130 sensors may detect a plurality of fingers on the left side of the user device 20 (e.g., on an edge of the display 120 or on the protective casing), and detect a single finger on the right side of the user device 20. In this exemplary scenario, the controller 110 may determine that the user is holding the user device 20 with his/her right hand because the detected grip pattern corresponds to an expected pattern when the user device 20 is held only with the right hand.

The operation key 140 may include one or more buttons or similar external control elements, which may generate an operation signal based on a detected input by the user. In addition to outputs from the touch panel 130, these operation signals may be supplied to the controller 110 for performing related processing and control. In certain aspects of the present disclosure, the processing and/or functions associated with external buttons and the like may be performed by the controller 110 in response to an input operation on the touch panel 130 display screen rather than the external button, key, etc. In this way, external buttons on the user device 20 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The user device 20 may include a motion sensor 108. The motion sensor 108 may detect features of motion (i.e., one or more movements) of the user device 20. For example, the motion sensor 108 may include an accelerometer to detect acceleration, a gyroscope to detect angular velocity, a geomagnetic sensor to detect direction, a geo-location sensor to detect location, etc., or a combination thereof to detect motion of the user device 20. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal. The motion sensor 108 can work in conjunction with a Global Positioning System (GPS) section 160. The GPS section 160 detects the present position of the terminal device 100. The information of the present position detected by the GPS section 160 is transmitted to the controller 110. An antenna 161 is connected to the GPS section 160 for receiving and transmitting signals to and from a GPS satellite.

The user device 20 may include a camera section 109, which includes a lens and shutter for capturing photographs of the surroundings around the user device 20. In an embodiment, the camera section 109 captures surroundings of an opposite side of the user device 20 from the user. The images of the captured photographs can be displayed on the display panel 120. A memory section saves the captured photographs. The memory section may reside within the camera section 109 or it may be part of the memory 150. The camera section 109 can be a separate feature attached to the user device 20 or it can be a built-in camera feature.

What is claimed is:

1. A system for providing a one-on-one game, the system comprising:
    a user interface including a touch panel display; and
    circuitry configured to
        control the touch panel display to display a plurality of graphic forms each indicating an identifier;
        identify a trajectory of a continuously drawn input on the touch panel display that selects a plurality of the graphic forms;
        identify the identifiers of the graphic forms corresponding to the input trajectory;
        identify at least a first command based on an arrangement of the identifiers when detecting an end of the input; and
        control a game operation of attacking an opponent based on the command.

2. The system of claim 1, wherein
    the circuitry is configured to control a game operation of performing continuous attacks based on a plurality of commands when a plurality of commands are identified based on the input trajectory.

3. The system of claim 1, wherein the circuitry is configured to:
    identify identifiers of graphic forms neighboring a graphic form corresponding to and end of the input; and
    display a hint as a candidate for selecting a neighboring graphic form to be a command based on the identifying.

4. The system of claim 1, wherein
    the circuitry is configured to control the touch panel display to apply a predetermined graphical effect to graphic forms along the input trajectory to differentiate the graphical forms along the input trajectory from other of the plurality of graphic forms.

5. The system of claim 1, wherein
    the circuitry is configured to control the touch panel display to change the identifiers of the selected graphic forms.

6. The system of claim 1, wherein
    the circuitry is configured to execute a hidden command when the selected graphic forms include a hidden command graphic form corresponding to the hidden command.

7. The system of claim 6, wherein the circuitry is configured to:
    identify graphic forms neighboring a selected graphic form as hint display graphic forms;
    calculate positional relationship information of the hint display graphic forms in relation to the hidden command graphic form; and
    display information corresponding to the positional relationship information on the hint display graphic forms.

8. The system of claim 7, wherein the circuitry is configured to:
    delete graphic forms that have been used for an attack and deploy new graphic forms before the input ends; and
    re-calculate positional relationship information of the hint display graphic forms in relation to the hidden command graphic form.

9. The system of claim 1, wherein
    the circuitry is configured to control the touch panel display to changing the identifiers of the graphic forms when detecting an operation for selecting graphic forms.

10. The system of claim 9, wherein
    the circuitry is configured to set unfavorable conditions for a match with the opponent after performing the identifier changing process.

11. A non-transitory computer-readable recording medium including a program, which when executed by a system comprising circuitry and a user interface including a touch panel display, causes circuitry of the system to:
    control the touch panel display to display a plurality of graphic forms each indicating an identifier;
    identify a trajectory of a continuously drawn input on the touch panel display that selects a plurality of the graphic forms;
    identify the identifiers of the graphic forms corresponding to the input trajectory;
    identify at least a first command based on an arrangement of the identifiers when detecting an end of the input; and
    control a game operation of attacking an opponent based on the command.

12. The non-transitory computer-readable recording medium of claim 11, the program further causing the circuitry of the system to:
    perform continuous attacks based on a plurality of commands when a plurality of commands are identified based on the input trajectory.

13. The non-transitory computer-readable recording medium of claim 11, the program further causing the circuitry of the system to:
    identify the identifiers of graphic forms neighboring a graphic form corresponding to an end of the input; and
    control the touch panel display to display a hint as a candidate for selecting a neighboring graphic form to be a command based on the identifying.

14. The non-transitory computer-readable recording medium of claim 11, the program further causing the circuitry of the system to:
    apply a predetermined graphical effect to graphic forms along the input trajectory to differentiate the graphical forms along the input trajectory from other of the plurality of graphic forms.

15. The non-transitory computer-readable recording medium of claim 11, the program further causing the circuitry of the system to:
    control the touch panel display to change the identifiers of the selected graphic forms.

16. The non-transitory computer-readable recording medium of claim 11, the program further causing the circuitry of the system to:

execute a hidden command when the selected graphic forms include a hidden command graphic form corresponding to the hidden command.

17. The non-transitory computer-readable recording medium of claim 16, the program further causing the circuitry of the system to:
identify graphic forms neighboring a selected graphic form as hint display graphic forms;
calculate positional relationship information of the hint display graphic forms in relation to the hidden command graphic form; and
display information corresponding to the positional relationship information on the hint display graphic forms.

18. The non-transitory computer-readable recording medium of claim 17, the program further causing the circuitry of the system to:
delete graphic forms that have been used for an attack and deploy new graphic forms before the input ends; and
re-calculate positional relationship information of the hint display graphic forms in relation to the hidden command graphic form.

19. The non-transitory computer-readable recording medium of claim 11, the program further causing the circuitry of the system to:
control the touch panel display to changing the identifiers of the graphic forms when detecting an operation for selecting graphic forms.

20. The non-transitory computer-readable recording medium of claim 19, the program further causing the circuitry of the system to:
set unfavorable conditions for a match with the opponent after performing the identifier changing process.

21. A game processing method performed by a system comprising a user interface including a touch panel display, the method comprising:
controlling, by circuitry of the system, the touch panel display to display a plurality of graphic forms each indicating an identifier;
identifying, by the circuitry, a trajectory of a continuously drawn input on the touch panel display that selects a plurality of the graphic forms;
identifying, by the circuitry, the identifiers of the graphic forms corresponding to the input trajectory;
identifying, by the circuitry, at least a first command based on an arrangement of the identifiers when detecting an end of the input; and
controlling a game operation of attacking an opponent based on the command.

22. The game processing method of claim 21, further comprising:
performing, by the circuitry, continuous attacks based on a plurality of commands when a plurality of commands are identified based on the input trajectory.

23. The game processing method of claim 21, further comprising:
identifying, by the circuitry, the identifiers of graphic forms neighboring a graphic form corresponding to an end of the input; and
controlling, by the circuitry, the touch panel display to display a hint as a candidate for selecting a neighboring graphic form to be a command based on the identifying.

24. The game processing method of claim 21, further comprising:
applying, by the circuitry, a predetermined graphical effect to graphic forms along the input trajectory to differentiate the graphical forms along the input trajectory from other of the plurality of graphic forms.

25. The game processing method of claim 21, further comprising:
controlling, by the circuitry, the touch panel display to change the identifiers of the selected graphic forms.

26. The game processing method of claim 21, further comprising:
executing, by the circuitry, a hidden command when the selected graphic forms include a hidden command graphic form corresponding to the hidden command.

27. The game processing method of claim 26, further comprising:
identifying, by the circuitry, graphic forms neighboring a selected graphic form as hint display graphic forms;
calculating, by the circuitry, positional relationship information of the hint display graphic forms in relation to the hidden command graphic form; and
displaying, by the touch panel display, information corresponding to the positional relationship information on the hint display graphic forms.

28. The game processing method of claim 27, further comprising:
deleting, by the circuitry, graphic forms that have been used for an attack and deploy new graphic forms before the input ends; and
re-calculating, by the circuitry, positional relationship information of the hint display graphic forms in relation to the hidden command graphic form.

29. The game processing method of claim 21, further comprising:
controlling, by the circuitry, the touch panel display to change the identifiers of the graphic forms when detecting an operation for selecting graphic forms.

30. The game processing method of claim 29, further comprising:
setting, by the circuitry, unfavorable conditions for a match with the opponent after performing the identifier changing process.

\* \* \* \* \*